United States Patent
Granqvist

[15] 3,672,229
[45] June 27, 1972

[54] APPARATUS FOR INDICATING ERRORS IN INCLINATION FOR INERTIAL NAVIGATION

[72] Inventor: Carl-Erik Granqvist, Lidingo, Sweden
[73] Assignee: AGA Aktiebolag, Lidingo, Sweden
[22] Filed: July 13, 1967
[21] Appl. No.: 653,075

Related U.S. Application Data

[63] Continuation-in-part of Ser. No. 467,182, June 11, 1965, abandoned, which is a continuation-in-part of Ser. No. 169,538, Jan. 29, 1962, abandoned.

[30] Foreign Application Priority Data

Feb. 6, 1961 Sweden..................................1200/61

[52] U.S. Cl..................................................73/504, 33/226
[51] Int. Cl........................................................G01p 15/14
[58] Field of Search...............................73/504, 505; 33/226

[56] References Cited
UNITED STATES PATENTS

| | | | |
|---|---|---|---|
| 2,396,617 | 3/1946 | Von Den Steinen...................... | 73/504 |
| 2,856,772 | 10/1958 | Strihafka................................. | 73/504 |
| 2,942,864 | 6/1960 | Sikora..................................... | 73/504 |

Primary Examiner—James J. Gill
Assistant Examiner—Herbert Goldstein
Attorney—Larson and Taylor

[57] ABSTRACT

An inertial navigation and guidance system includes a gyroscope and accelerometer mounted on a platform for establishing a common normally horizontal plane. The gyroscope is precessed at a constant rate and a pulse signal is produced whose frequency varies in accordance with the deviation of the platform from the horizontal. An electronic gate compares the pulse signal with a constant frequency reference signal. A further pulse signal is produced in response to the accelerational forces acting on the accelerometer in the common plane. This latter pulse signal is applied together with the output of the gate and with a constant frequency reference signal to an adder which provides an output signal related to the acceleration of the system.

5 Claims, 5 Drawing Figures

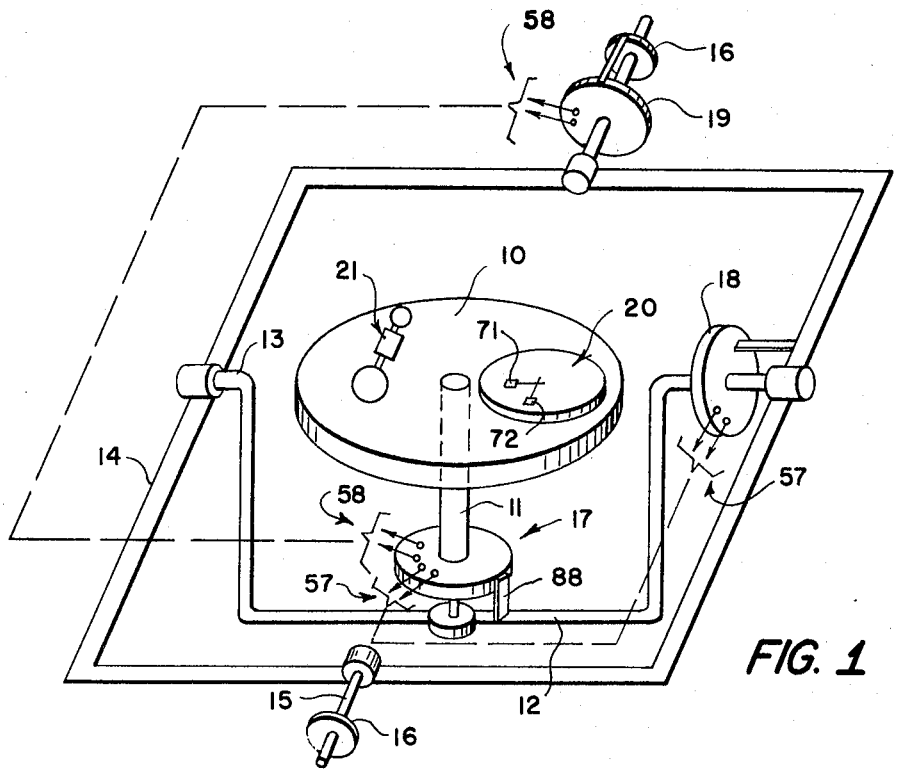
FIG. 1
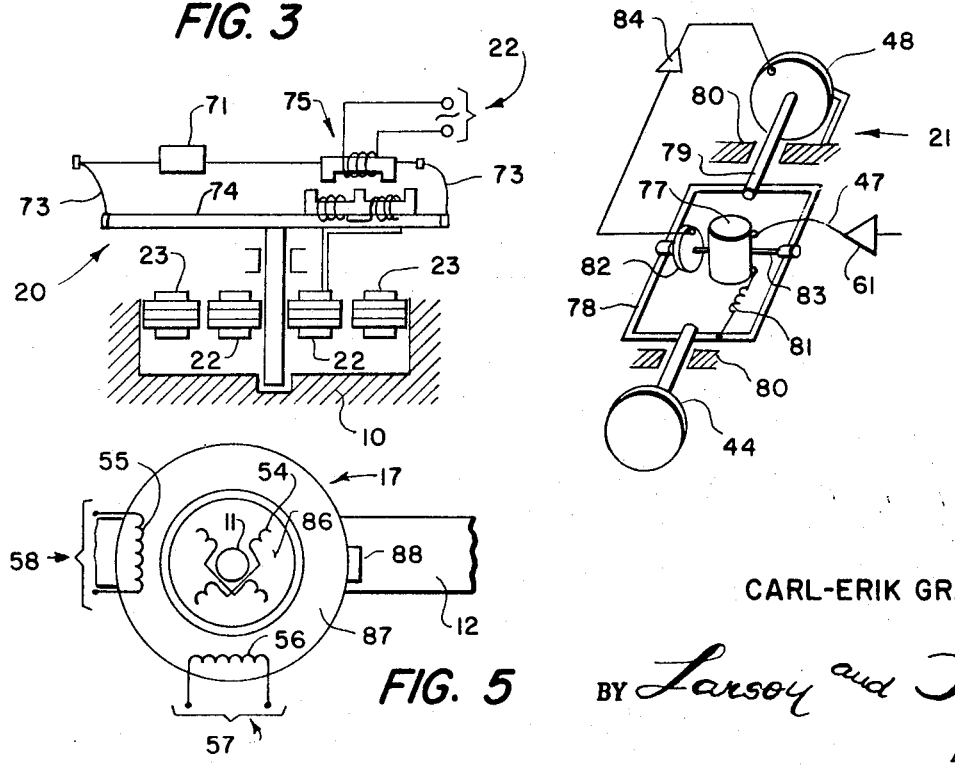
INVENTOR
CARL-ERIK GRANQVIST
BY Larson and Taylor
ATTORNEYS

APPARATUS FOR INDICATING ERRORS IN INCLINATION FOR INERTIAL NAVIGATION

Cross References to Related Applications

This Application is a continuation in part of application Ser. No. 467,182 filed June 11, 1965, now abandoned, which in turn is a continuation in part of application Ser. No. 169,538 filed Jan. 29, 1962 abandoned.

FIELD OF THE INVENTION

This invention relates to an inertial navigation or guidance system comprising a horizontal accelerometer platform.

BACKGROUND OF THE INVENTION AND DESCRIPTION OF THE PRIOR ART

Inertial navigation and guidance systems primarily rely on devices for sensing horizontal accelerations from which velocity and distance can be obtained by successive integration. Such devices or accelerometers, must be mounted on platforms that are carefully maintained in a horizontal plane in order to prevent the accelerometer from being affected by gravitational acceleration.

In copending United States application Ser. No. 86,975, filed Feb. 3, 1961, now U. S. Pat. No. 3,304,788 granted on Feb. 21, 1967, we have already described a free gyroscope which can be made to precess at a controllable rate and in which a change in the controlled rate of precession can be measured by a scanning device which delivers a signal in the form of a low frequency signal that directly represents any deviation from said controlled rate of precession. If the rate of precession is controlled by reference to the speed and direction of travel of a vehicle, derived for instance from the indications of an accelerometer, it can be controlled to remain constant with reference to the horizontal. The principle of keeping an accelerometer platform stable by driving it from a stable platform by reference to the integrated signals of an accelerometer is well known to the art. The use of a precessing gyroscope in which the rate of precession is thus controlled removes the need of a stable platform, since the signals delivered by the scanning device can be directly resolved in a sine-cosine resolver and the outputs of said sine-cosine resolver used to activate torquers for tilting the accelerometer platform until the error signal disappears. Thus the gyroscope which is itself mounted on the accelerometer platform will directly operate to keep this platform in the required horizontal position.

Nevertheless, if an accelerometer is mounted on such a platform, which responds to accelerations in the plane of the platform, transient errors in the signals derived from the accelerometer will still occur during the continuous process of reerection, and in course of time these will falsify the results of the integration.

BRIEF DESCRIPTION OF THE INVENTION

It is therefore the object of the present invention to provide an apparatus which will automatically operate to eliminate this source of error.

It is a further object of this invention to provide a novel and improved inertial navigation and guidance system.

To this end the present invention discloses an inertial navigation and guidance system comprising at least one gyroscope and one accelerometer, a platform means for establishing a common normally horizontal plane in which both the gyroscope and the accelerometer are mounted, a gimbal mounting for said gyroscope comprising inner and outer gimbals mounted on an inner and an outer gimbal shaft, respectively, means for processing the gyroscope at a constant rate with reference to the horizontal about the outer gimbal shaft, a first indicating means connected with the precessing gyroscope for generating a low frequency pulse signal, the phase position of which varies when the platform means deviates from the horizontal, an electronic gate having two inputs and one output and means for supplying said low frequency pulse signal to one input and means for supplying a constant frequency reference signal to the other input, an adder with at least two inputs, one of which is connected with the output of the electronic gate, a second indicating means connected with the accelerometer for generating a pulse signal in response to accelerational forces acting on the accelerometer in the said common plane, and means for supplying said accelerometer pulse signal to another input of the adder.

Other objects and advantages of the present invention will be apparent from the accompanying description when taken in conjunction with the following drawings, wherein:

FIG. 1 is an overall perspective view of the platform which carries an accelerometer and a gyroscope together with the gimbal arrangement carrying the plate and its servo motor.

FIG. 3 illustrates the details of the accelerometer of FIGS. 1 and 2;

FIG. 4 illustrates the details of the gyroscope of FIGS. 1 and 2;

FIG. 5 is a detail representation of the connections of the resolver of FIG. 1;

Figure 2:
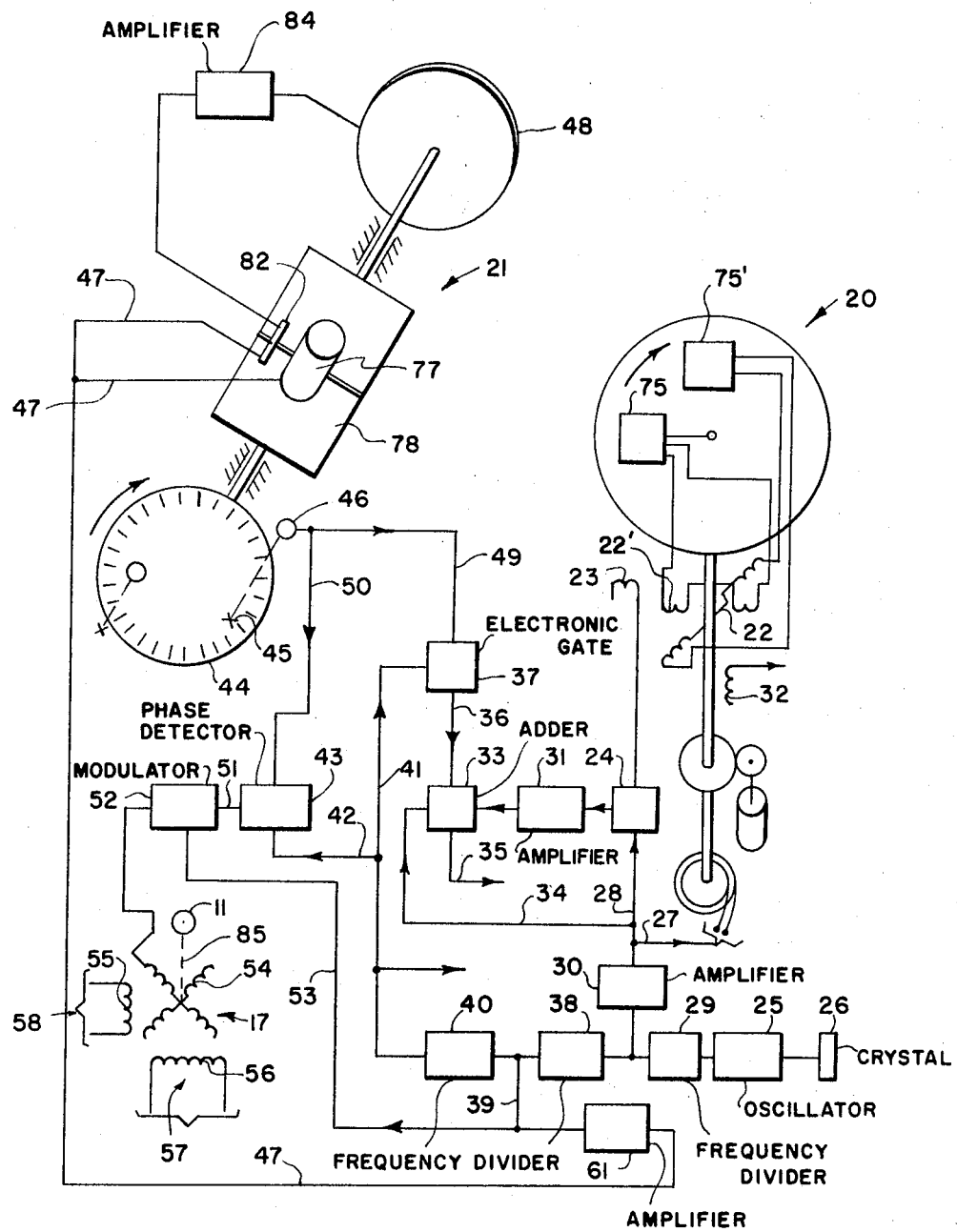
FIG. 2 is a block wiring diagram showing the relationship of the several components of a specific embodiment of the present invention.

Referring to FIG. 1, the horizontal platform, indicated generally by the numeral 10, carries an accelerometer 20 and a gyroscope 21 constructed in accordance with FIGS. 2 – 4. It is pointed out that the platform need not necessarily exist as a physical structure as such, but it is sufficient that a plane can be derived which takes the position which the platform should have.

The platform is supported by a shaft 11 mounted in an inner gimbal 12 which in turn is pivotably suspended by a shaft 13 in an outer gimbal 14 pivoting on a shaft 15 supported in bearings 16 in the frame of the vehicle containing the inertial guidance or navigation system. A sine-cosine resolver 17 is associated with the shaft 11 supporting the platform 10 in such a manner that the movable coils 54 of the resolver 17 are mechanically connected with the shaft 11 by means of a disc 86 (see FIG. 5), while the fixed coils of this resolver are connected with the inner gimbal 12 by means of the housing 87 of the resolver 17 and a bar 88 (FIG. 5). Moreover, a first servo motor 18 is included in the shaft 13 suspending the inner gimbal 12 in the outer gimbal 14. A similar servo motor 19 is provided in the shaft 15 which carries the outer gimbal 14 in the bearings 16. The rotors of servo motors, 18 and 19 are connected with the shafts 13 and 15, respectively, while the stators of these servo motors are connected with the gimbal 14 and one of the bearings 16, respectively. The purpose of these servo motors is to apply torque to the gimbals to maintain the platform permanently in an exact horizontal position.

To permit the actual position of the platform to be determined with sufficient accuracy, means must be provided for indicating every deviation with an extremely high degree of precision. For this reason it is desirable also to provide a gyroscope on the horizontal platform by reference to which the position in space of the horizontal platform can be monitored and continuously corrected. The gyroscope may be constructed in accordance with FIG. 6 of the above mentioned U.S. Pat. No. 3,304,788. The manner in which this is carried into effect in the present invention is shown in FIGS. 2 and 4.

In this diagram the horizontal accelerometer platform itself is not shown. The accelerometer mounted on the platform is generally indicated at 20, whereas a gyroscope similarly mounted on the platform is generally indicated at 21. The system includes circuitry employing a variety of electronic elements of a kind well known to the art. The individual elements are merely shown in block form because their detailed construction requires no particular description and has no direct bearing upon the invention.

The accelerometer 20 in the illustrated embodiment is presumed to be of a kind that has been described in greater detail in our copending United States application Ser. No. 91,728, filed Feb. 27, 1961 now U.S. Pat. No. 3,304,786, granted on Feb. 21, 1967, and vital elements thereof are shown in FIG. 3. Briefly, this accelerometer comprises at least two weights 71, 72 (FIG. 1) eccentrically suspended between springs 73 on a revolving disc 74 (FIG. 3). As long as the revolving disc is horizontal and the vehicle carrying the system is not itself subjected to horizontal accelerations, the only accelerations acting on the weights are the accelerations of the centrifugal forces which displace the weights against the resistance of the springs. The radial position of the weight 71 is sensed by pick-off 75 and the radial position of weight 72 (FIG. 1) is sensed by similar pick-off 75' (FIG. 2) which are supplied with a carrier frequency over a line 27 and which modulate the carrier frequency constant in dependence upon the magnitude of radial displacement of the weights, i.e., upon the speed of rotation of the rotating disc. The weights of the accelerometer are suspended in quadrature and the outputs of the two pick-offs are taken to a sine-cosine resolver comprising input coils 22 and 22' connected with and rotating with the pick-offs 75 and 75'. The sine-cosine resolver also comprises two mixed output coils 23 and 32 in quadrature and each one of these output coils cooperates with both input coils 22 and 22'. As a result thereof the amplitude and the duration of a half-period of the modulated output voltage of either of the fixed output coils 23 and 32 is indicative of the component of the acceleration in the direction represented by said fixed output coils as described in our said U.S. Pat. No. 3,304,786. If the sine-cosine resolver is arranged to resolve the modulating frequency into its north-south and east-west components, for instance by slaving the platform 10 to a north-seeking device (not shown in the drawing) so that the output coils 23 and 32 are oriented in the directions north-south and east-west, the output of said coils 23 and 32 will directly indicate the vector components of this linear acceleration in terrestrial coordinates. Since each of these output components is further processed in a similar system of apparatus, the following description may, with convenience, be confined to describing only one of them, namely the component derived from output coil 23.

The carrier frequency supplied to the accelerometer is derived from an oscillator 25 which is controlled by a crystal 26. Since the constancy of the frequency of a crystal controlled oscillator is the better the higher its frequency, it is preferred that the oscillator frequency should be a high multiple of the carrier frequency supplied to the pick-ups of the accelerometer via line 27. Consequently the oscillator frequency is first taken to a frequency divider 29. Moreover, since in the illustrated system, as will later be described, it is also desired to supply a a frequency as low as three cycles per second, a convenient frequency for the oscillator would be say 98,304 cycles per sec. The frequency divider 29 may then be arranged to step down this frequency in the proportion 1:25 or 1:32, so that the frequency appearing in lines 27 and 28 after amplification in an amplifier 30 will be 3,072 cps. The motor for driving the accelerometer at a constant speed may also be controlled by a frequency derived from the oscillator although this is not specially shown in the drawing.

The phase of the modulating frequency n the output from coil 23 is now compared in a device 24 with the phase of the oscillator frequency as a reference in line 28. As is described in detail in said U. S. Pat. No. 3,304,786 for corresponding elements, the output in coil 23 will include a low frequency envelope voltage, the two half-waves of which are of equal duration if the accelerometer is not subjected to any acceleration. If an acceleration is measured, the two half-waves are of different duration, i.e., the voltage envelope will be distorted such that one half-wave extends over more than half of the period of oscillation. The output of coil 23 is, therefore, rectified, amplified and limited by device 24 to produce a series of voltages which are compared in device 24 to a reference from oscillator 25. If the phase displacement of the modulating frequency from coil 23 varies, conformably varying pulses of carrier frequency will appear in the output of the device 24. The number of these pulses will then correspond to the magnitude of the component of acceleration in one coordinate direction. These pulses are amplified in an amplifier 31 and then supplied to one input circuit of an adder 33. The adder device at 33 is at the same time supplied with pulses derived from the frequency in lines 27 and 28 after this has been treated in the same way at the output from device 24. The corresponding electronic devices are not specially shown in the drawing in order to avoid complications and are presumed to be contained in line 34. Line 27 supplies the relatively high frequency alternating current to pick-offs 75 and 75'. The device at 33 adds the two sets of pulses to provide an output at 35 which is taken to further electronic means which also receive the output from a similar system associated with the second coil 32 of the sine-cosine divider, and which are devised to provide a digital indication of the direction and magnitude of the acceleration of the vehicle. Further details of such a system are described in said U.S. Pat. No. 3,304,786 and as such they form no part of the present invention.

The accuracy of the indications derived from the accelerometer decisively depends upon the rotating disc or platform 10 being maintained exactly in the horizontal. The accelerometer platform is kept in the required horizontal position by gyroscopic means. In a normal system two gyroscopes will be used, but for the sake of convenience the description will first be confined to the nature and functions of only one gyroscope generally indicated at 21.

The aforesaid 3,072 cps. output of the frequency divider 29 is taken to a further frequency divider 38 which further reduces this frequency in the proportion of $1.2^3$ or 1.8, so that the frequency appearing in line 39 will be 384 cps. Part of this frequency is applied to yet another divider 40 which again reduces the same in the proportion of $1.2^7$ or 1.128 to supply a frequency of only 3 cps. via line 42, on the one hand, to a phase detector 43 and on the other hand, to an electronic gate 37 via line 41.

Gyroscope 21 is of the type described, for example, in U.S. Pat. No. 3,304,788 referred to above and the basic construction thereof is shown in FIG. 4. Gyroscope 21 is one of the gyroscopes included in the inertial navigation system proper, and generally, functions to maintain the accelerometer platform horizontal. Considering the basic operation of gyroscope 21, the rotor speed of the gyro rotor (not shown) in the gyro-housing 77 is precisely controlled by the 384 cps frequency derived from the frequency divider 38, after amplification in amplifying means 61, through line 47. The gyroscope 21 is a free gyroscope suspended in a gimbal 78 and mounted on the accelerometer platform by means of a shaft 79 and bearings 80. By the application of a constant torque by means of a spring 81, the gyroscope is first made to precess in the outer gimbal bearings 80 at a constant rate in inertial space or at a rate which remains constant when the vehicle is stationary.

For the compensation of drift the outer gimbal carries a pick-off 82 (see FIG. 4) which is inserted between the inner gimbal shaft 83 and the gimbal 78, for instance in such a way that a moveable armature is connected with the shaft 83 and an E-core (not shown) cooperating with this armature is connected with the gimbal 78. A corresponding element has been shown in said U. S. Pat. No. 3,304,788.

The pick-off arrangement 82 senses any tendency of the inner gimbal to move in relation to the outer gimbal, the output from the pick-off 82 being used after amplification in an amplifier 84 to control a servo motor 48 which applies a compensating torque to the suspension conteracting any such tendency. The frequency supplied to this pick-off is likewise that delivered by amplifier 61 through line 47 (see also FIG. 2).

Associated with a disc 44 mounted on the gimbal shaft 79 is a scanner, for instance in the form of a light source 45 and a photocell 46, as shown in FIG. 2, in which the opaque and transparent segments of the rotating disc induce current pulses at a frequency depending primarily upon the speed of precession of the gyroscope. The scanner is mounted on the accelerometer platform and the rate of precession of the gyroscope is so maintained that the frequency of the pulses delivered by the scanner is exactly 3 cps when the vehicle is at rest and the platform has been horizontalized. The frequency delivered by the photocell 46 is supplied to phase detector 43 for comparison with the 3 cps. in line 42 derived from the oscillator 25. So long as the platform remains horizontal no signal will appear in the output from phase detector 43. However, as soon as the platform begins to move out of the horizontal, the frequency delivered by the photocell will slightly change and a corresponding signal will appear in the output 51 of phase detector 43. In a modulator 52 this signal modulates the assumed frequency of 384 cps. applied through line 53 and the modulated signal is taken to one input winding of a resolver generally indicated by 17 (FIGS. 1, 2 and 5), having two input windings 54 mechanically connected with the shaft 11 as indicated by the dotted line 85 (FIG. 2) and having two output windings 55 and 56. The second gyroscope mentioned hereinabove is used to provide an output signal which is fed in a corresponding way to the other input winding 54 of resolver 17. The resolver resolves the signals supplied to the two input windings 54 into their sine and cosine components which appear in the coils 55 and 56. These coils are connected by lines 57 and 58 to the two servo motors 18 and 19, as indicated by the dotted lines in FIG. 1. The servo motors correct the position of the platform, and when this correction has been made, the signal in lines 57 and 58 will cease.

From the instant the accelerometer platform deviates from its prescribed horizontal position to the instant of its restoration, the accelerometer will naturally produce a signal which includes an unwanted component of gravity and the output signal in line 35 therefore requires suitable correction during this period. According to the invention this is accomplished by simultaneously feeding the frequency delivered by photocell 46 to one input of an electronic gate 37 through line 49, whereas the constant 3 cps. frequency derived from the oscillator is applied through line 41 to the other input of the gate. So long as the two frequencies are equal, no pulses appear in the output from gate 37, but as soon as there is a difference in the two frequencies the gate will pass a number of pulses which are added or subtracted in the adder 33 from the number of pulses appearing in its output 35. Since the number of pulses appearing in line 36 depends upon the transient deviation of the platform from the horizontal, the resultant correction of the number of output pulses in line 35 can be arranged to compensate the error signal from the accelerometer exactly. Consequently, successive integration of the signals appearing in line 35 will provide an exact measure of the ground speed of the vehicle and of the distance covered. It will be understood that this invention is susceptible to modification in order to adapt it to different usages and conditions and, accordingly, it is desired to comprehend such modifications within this invention as may fall within the scope of the appended claims.

What is claimed is

1. An inertia navigation and guidance system comprising at least one gyroscope and one accelerometer, a platform means for establishing a common normally horizontal plane in which both the gyroscope and the accelerometer are mounted, a gimbal mounting for said gyroscope comprising inner and outer gimbals mounted on an inner and outer gimbal shaft, respectively, means for precessing the gyroscope at a constant rate with reference to the horizontal about the outer gimbal shaft, a first indicating means connected with the precessing gyroscope for generating a low frequency pulse signal, the frequency of which varies when the platform means deviates from the horizontal about an axis parallel to the outer gimbal shaft, an electronic gate including two inputs and one output and means for supplying said low frequency pulse signal to one input and means for supplying a constant frequency reference signal to the other input, said gate producing an output signal whose frequency is a function of the frequency difference between said input signals, an adder having a plurality of inputs, one of which is connected with the output of the electronic gate, a second indicating means connected with the accelerometer for generating a pulse signal in response to the accelerational forces acting on the accelerometer in the said common plane along an axis perpendicular to the outer gimbal shaft, means for supplying said accelerometer pulse signal to a second input of the adder and means for supplying a constant frequency reference signal to a third input of the adder, said adder adding the frequencies of the input signals thereto.

2. A system as claimed in claim 1 and further comprising a first phase detector with two inputs and at least one output and means for supplying the output signal of the accelerometer to one input of the first phase detector, and means for supplying a carrier frequency to another input of the said first phase detector, the output of the said first phase detector being connected to said second input of the said adder.

3. A system as claimed in claim 2 including a second phase detector having first and second inputs and an output, means for supplying a reference signal to one input of said second phase detector, means for supplying said low frequency signal to another input of said second phase detector, wherein the output signal from said second phase detector is proportional to the deviation of said platform means from a horizontal plane about an axis parallel with the outer gimbal shaft, and correcting means connected to the said output of the second phase detecting means for restoring the said platform means to the horizontal position when the platform means has deviated therefrom.

4. A system as claimed in claim 2 wherein said second indicating means comprises a pick-off coil for producing a voltage proportional to said accelerational forces, a sine-cosine resolver for receiving voltages from said pick-off coil and having an output coil, said output coil being connected to one input of said first phase detector.

5. A system as claimed in claim 2 including a pick-off-coil means positioned between the gimbals of the gyroscope for sensing relative movement between the inner and the outer gimbal of the gyroscope.

* * * * *